United States Patent
McCrobie

[15] 3,659,922
[45] May 2, 1972

[54] SYMMETRICAL HALF-LENS OPTICAL SYSTEM

[72] Inventor: George L. McCrobie, Rochester, N.Y.
[73] Assignee: Xerox Corporation, Stamford, Conn.
[22] Filed: Feb. 25, 1971
[21] Appl. No.: 118,745

[52] U.S. Cl. ..................................................350/202
[51] Int. Cl. ............................................G02b 17/00
[58] Field of Search.....................................350/202

[56] References Cited

FOREIGN PATENTS OR APPLICATIONS 1,008,952  11/1965  Great Britain.........................350/202

Primary Examiner—John K. Corbin
Attorney—James J. Ralabate, Donald F. Daley and Thomas J. Wall

[57] ABSTRACT

A two component Split-Dagor type lens is herein disclosed utilizing a reflecting surface at the stop position to reverse the light rays passing through the system thus simulating a conventional symmetrical Split-Dagor system.

1 Claims, 3 Drawing Figures

Patented May 2, 1972
3,659,922
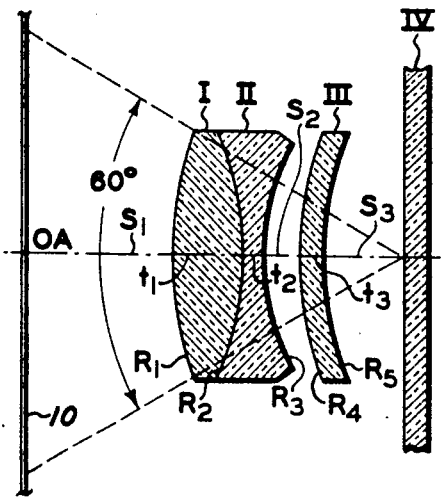
FIG. 1
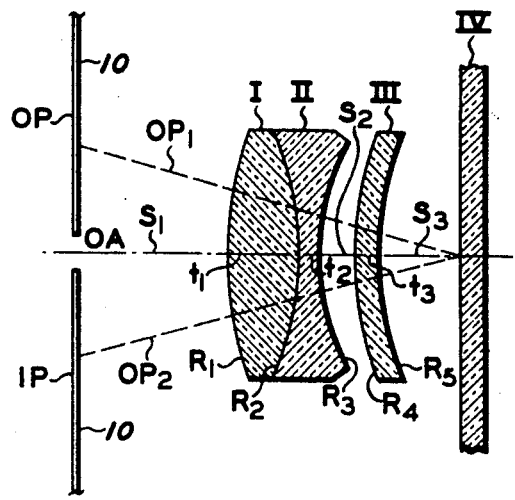
FIG. 2
| E.F.L. - 7.47 f/4.5 - f/11.0 | | | | | |
|---|---|---|---|---|---|
| LENS | RADII | THICKNESS | SPACES | $N_d$ | $V_d$ |
| I | $R_1 = 2.145$ | $t_1 = .687$ | $S_1 = 13.280$ | 1.613 | 58.6 |
|  | $-R_2 = 11.606$ |  |  |  |  |
| II |  | $t_2 = .253$ |  | 1.541 | 47.2 |
|  | $R_3 = 1.524$ |  |  |  |  |
|  |  |  | $S_2 = .114$ |  |  |
|  | $R_4 = 2.273$ |  |  |  |  |
| III |  | $t_3 = .289$ |  | 1.541 | 47.2 |
|  | $R_5 = 3.641$ |  |  |  |  |
|  |  |  | $S_3 = .306$ |  |  |
FIG. 3
INVENTOR.
GEORGE L. McCROBIE
BY 
ATTORNEY

SYMMETRICAL HALF-LENS OPTICAL SYSTEM

The present invention relates to Split-Dagor type symmetrical lens system and more particularly to a lens system which is particularly suited to a copier optical system which operates at fixed object-to-image distances while faithfully reproducing information. In particular, the optical system of the present invention is a multi-element optical system employing half-lens techniques whereby light rays are directed through the lens elements to a mirror which is positioned at the stop or diaphram position and effectively reverses the direction of the light rays passing through the system so as to function as a normal symmetrical Split-Dagor optical system.

In reproduction systems wherein light patterns of original input scene information are projected onto a photosensitive member to form a copy of the information on the photosensitive member, a lens system is required which focuses the light pattern on the photosensitive member to reproduce faithfully and in sharp, clear image configuration the light pattern of the original information. The characteristics of lens systems heretofore used for copying purposes such as, the size of field angle that can be tolerated, the degree of resolution and other rating factors, are to a large extent, dependent upon the speed, or $f$-number of the lens system. As a general matter, it is known that as the $f$-number decreases, the overall performance of a copier lens system declines noticeably if the field angle remains constant. As a result, the lens systems used in the present copiers maintain $f$-numbers in a predetermined range to assure good resolution at reasonable field angles as well as over a wide spectral range to form images of adequate quality suitable for use in a copier environment. It will further be appreciated that such lenses as heretofore used in most copier systems have, for the most part, been full optical lens systems, as opposed to half-lens systems as in the present invention.

A half-lens system has certain advantages over a full lens system in that the overall conjugate distance between the object plane and the image plane is effectively folded at the stop position. In addition, a half-lens system advantageously assures absolute symmetry in the lens system when a symmetrical lens system is preferred. Further, since the lens system is a half-lens system, the overall conjugate distance between the object plane and the image plane, along the optical axis, is naturally folded without the use of reflecting accessories in the optical path.

Accordingly, it is an object of the present invention to provide an improved design of a Split-Dagor type lens system in half-lens configuration.

Another object is to provide a copier lens system in which the conjugate spacing between the object plane and the image plane is substantially folded in half along the optical axis while at the same time maintaining the conjugate distance along the optical axis.

The invention described herein is a Split-Dagor type lens system, in half-lens configuration, in which a three-element lens system is combined in a two component photographic lens configuration utilizing a mirror at the stop position to effectively reverse the light rays passing through the system and thereby simulate a normal symmetrical Split-Dagor type lens system. The optical system has three lens elements including, in the following order, a first lens element of positive power, a second lens element of negative power contiguous with the first lens element and a third lens element of positive power disposed between the second lens element and the stop position. In the stop position a mirror is positioned which is normal to the optical axis of the lens system to reflect the light rays back through the lens elements in reverse order wherein the lens functions in a normal symmetrical manner. In the specific embodiment of the optical system, the first lens element in the front component is a double convex lens, the second lens element is a double concave lens and the third lens element is a convex-concave element. The mirror surface, in the stop or diaphram position is preferably distortion free and optically perpendicular to the optical axis of the optical system.

For a better understanding of the invention as well as the stated and other objects of the invention reference may be had to the following detailed description to be read in conjunction with the accompanying drawings in which:

FIG. 1 is a top view of the optical system;
FIG. 2 is a side view of the optical system;
FIG. 3 is a chart of constructional data for the lens system shown in FIGS. 1 and 2.

The lens system disclosed herein, a half-lens system which functions as a full symmetrical lens system, maintains high performance characteristics at a field angle in the order of 60 degrees, has good color fidelity at speeds as high as $f/4.5$ at a 1 to 1 magnification factor. In addition, the lens system is adapted to produce high quality images in the copier environment.

Referring in more detail to the drawings the optical system is represented in out-of-scale schematic drawings. The top view of the system, represented in FIG. 1, shows the three-component system including a doublet lens, a singlet lens, and a reflector. The optical axis is represented as the broken line OA, with the field angle illustrated at 60°.

The Split-Dagor type half-lens is a compound unit of three lens elements with a reflecting surface, such as a mirror, at the stop surface of the system. Lens element I is a positive power lens, lens element II is a negative power lens, and lens element III is a positive power lens. Lens elements I and II are cemented together forming a doublet lens component. Any suitable transparent optical cement may be used to cement these elements together. Preferably the cement should have an index of refraction which closely approximates that of either lens I or lens II. Eastman Kodak Company of Rochester, New York makes optical cements for this purpose and they are readily available. Lens III is separated from lens II by an air gap. Lens III is the closest lens element to the stop or diaphram. Lens element III is also spaced from the stop surface by an air gap.

Any one of several well known optical glasses can be used for the lenses illustrated. For example, dense barium crown type (SK-4) or extra light flint type (LLF-2) glass made by Schott Optical Glass Company of Duryea, Pennsylvania are suitable for the lens elements.

FIG 1 illustrates in plain view the wide field angle of the lens system on the plane 10. Plane 10, in FIG. 1 illustrates the width of the object plane OP. FIG. 2 illustrates, in side elevation view the plane 10 on which is located the object plane OP and the image plane IP with the optical path $OP_1$ from the object plane passing through the lens elements I, II, and III to the reflecting surface or mirror IV then from the mirror IV via optical path $OP_2$ through the lens elements III, II, and I to the image plane IP.

As illustrated the lens system is spaced from the object plane, the distance being measured along the optical axis, $S_1 = 13.280$ inches, $S_2 = 0.114$ inches, and $S_3 = 0.306$ inches.

The thickness of the various lens elements, measured along the optical axis, is $t_1 = 0.687$, $t_2 = 0.253$, and $t_3 = 0.289$ the measurements in inches being the thickness of the lenses I, II, and III, respectively.

Radii of the various lens elements may be charted as follows:

| Lens | |
|---|---|
| I | $R_1 = 2.145$ |
| II | $-R_2 = 11.606$ |
| III | $R_3 = 1.524$ |
| | $R_4 = 2.273$ |
| | $R_5 = 3.641$ |

The lens is corrected for a spectral range from 400 through 550 nanometers over the field angle of 60°.

As shown in the chart of FIG. 3 the radii of curvature R of the lens elements, the thickness $t$ of the elements, the index of refraction $N_d$ and the Abbe numbers $\sqrt{d}$ of the elements are all expressed in the conventional manner.

What is claimed is:

1. An optical objective including a first component comprised of a positive element and a negative element in contiguous release joined to form a doublet and a second component positive element separated from the negative element by an air gap and a reflecting surface position on the other side of said negative element at the stop position constructed substantially according to the following specifications:

E.F.L. = 7.47 f/4.5 — f/11.0

| Lens | Radii | Thickness | Spaces | $N_d$ | $V_d$ |
|---|---|---|---|---|---|
| I | $R_1 = 2.145$ | | $S_1 = 13.280$ | | |
| | | $t_1 = 0.687$ | | 1.613 | 58.6 |
| II | $-R_2 = 11.606$ | | | | |
| | | $t_2 = 0.253$ | | 1.541 | 47.2 |
| | $R_3 = 1.524$ | | | | |
| | $R_4 = 2.273$ | | $S_2 = 0.114$ | | |
| III | | $t_3 = 0.289$ | | 1.541 | 47.2 |
| | $R_5 = 3.641$ | | | | |
| | | | $S_3 = 0.306$ | | |

* * * * *